United States Patent
Sharp et al.

(10) Patent No.: US 9,251,590 B2
(45) Date of Patent: Feb. 2, 2016

(54) CAMERA POSE ESTIMATION FOR 3D RECONSTRUCTION

(71) Applicant: Microsoft Corporation, Redmond, WA (US)

(72) Inventors: Toby Sharp, Cambridge (GB); Andrew William Fitzgibbon, Cambridge (GB); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/749,497

(22) Filed: Jan. 24, 2013

(65) Prior Publication Data

US 2014/0206443 A1    Jul. 24, 2014

(51) Int. Cl.
*A63F 9/24*    (2006.01)
*G06T 7/00*    (2006.01)
(Continued)

(52) U.S. Cl.
CPC .............. *G06T 7/0075* (2013.01); *A63F 13/00* (2013.01); *A63F 13/213* (2014.09); *G06T 7/0018* (2013.01); *G06T 7/0044* (2013.01); *G06T 7/0046* (2013.01); *G06T 7/0051* (2013.01);
(Continued)

(58) Field of Classification Search
CPC ................ A63F 2300/1087; A63F 2300/69; A63F 13/10; A63F 2300/1093; A63F 2300/6607; A63F 2300/66; G06T 17/00; G06T 2207/10028; G06T 19/006; G06T 17/0044; G06T 7/0051; G06T 7/0024; G06T 7/2046; G06K 2209/40; G06K 9/00201; G06K 9/00; G01B 11/25; H04N 5/2226
USPC ............... 463/36–39; 382/106–108; 348/153–154; 345/418–422, 158
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    201254344 B    6/2010
EP    0583061 A2    2/1994
(Continued)

OTHER PUBLICATIONS

"MapReduce", Jan. 11, 2012, Wikipedia, <http://web.archive.org/web/20120111070052/http://en.wikipedia.org/wiki/MapReduce>.*
(Continued)

*Primary Examiner* — Justin Myhr
(74) *Attorney, Agent, or Firm* — Steve Wight; Judy Yee; Micky Minhas

(57) ABSTRACT

Camera pose estimation for 3D reconstruction is described, for example, to enable position and orientation of a depth camera moving in an environment to be tracked for robotics, gaming and other applications. In various embodiments, depth observations from the mobile depth camera are aligned with surfaces of a 3D model of the environment in order to find an updated position and orientation of the mobile depth camera which facilitates the alignment. For example, the mobile depth camera is moved through the environment in order to build a 3D reconstruction of surfaces in the environment which may be stored as the 3D model. In examples, an initial estimate of the pose of the mobile depth camera is obtained and then updated by using a parallelized optimization process in real time.

20 Claims, 11 Drawing Sheets

(51) Int. Cl.
  *A63F 13/00* (2014.01)
  *G06T 19/00* (2011.01)
  *A63F 13/213* (2014.01)
(52) U.S. Cl.
  CPC ............. *G06T 7/0057* (2013.01); *G06T 19/006* (2013.01); *A63F 2009/2435* (2013.01); *G06T 2207/10024* (2013.01); *G06T 2207/10028* (2013.01); *G06T 2207/30244* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,392 A | 7/1999 | Ho |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,009,359 A | 12/1999 | El-Hakim et al. |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,781,618 B2 | 8/2004 | Beardsley |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |

(56) References Cited

U.S. PATENT DOCUMENTS

| | | | |
|---|---|---|---|
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,627,447 | B2 | 12/2009 | Marsh et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| 7,860,301 | B2 | 12/2010 | Se et al. |
| RE42,256 | E | 3/2011 | Edwards |
| 7,898,522 | B2 | 3/2011 | Hildreth et al. |
| 8,031,909 | B2 | 10/2011 | Se et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 * | 12/2011 | Marks .......................... 345/632 |
| 2002/0069013 | A1 | 6/2002 | Navab et al. |
| 2008/0026838 | A1 | 1/2008 | Dunstan et al. |
| 2009/0231425 | A1 | 9/2009 | Zalewski |
| 2010/0080415 | A1 * | 4/2010 | Qureshi et al. ................ 382/103 |
| 2010/0094460 | A1 | 4/2010 | Choi et al. |
| 2010/0295783 | A1 * | 11/2010 | El Dokor et al. ............. 345/158 |
| 2010/0296724 | A1 | 11/2010 | Chang et al. |
| 2010/0302247 | A1 * | 12/2010 | Perez et al. ................... 345/440 |
| 2012/0194516 | A1 | 8/2012 | Newcombe et al. |
| 2012/0194517 | A1 * | 8/2012 | Izadi et al. .................... 345/420 |
| 2012/0194644 | A1 * | 8/2012 | Newcombe et al. ............ 348/46 |
| 2012/0194650 | A1 | 8/2012 | Izadi et al. |
| 2012/0195471 | A1 | 8/2012 | Newcombe et al. |
| 2012/0196679 | A1 * | 8/2012 | Newcombe et al. ............ 463/36 |
| 2012/0212509 | A1 * | 8/2012 | Benko et al. .................. 345/633 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |

OTHER PUBLICATIONS

"Signed distance function", Jan. 20, 2012, Wikipedia, <http://web.archive.org/web/20120120095205/http://en.wikipedia.org/wiki/Signed_distance_function>.*

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"International Search Report", Mailed Date—Aug. 28, 2012, Application No. PCT/US2012/020681, Filed Date—Jan. 9, 2012, pp. 8.

"International Search Report", Mailed Date: Aug. 30, 2012, Application No. PCT/US2012/020687, Filed Date: Jan. 9, 2012, pp. 8.

(56) References Cited

OTHER PUBLICATIONS

Andrew J., et al., "KinectFusion Real-time Dense Surface Mapping and Tracking", In Proceedings of 10th IEEE International Symposium on Mixed and Augmented Reality, Oct. 29, 2011, pp. 10.

Whelan, et al., "Robust Tracking for Real-Time Dense RGB-D Mapping with Kintinuous", In technical report of MIT, Sep. 17, 2012, pp. 10.

Lysenkov, et al., "Recognition and Pose Estimation of Rigid Transparent Objects with a Kinect Sensor", In Proceedings of Conference on Robotics: Science and Systems, Jul. 13, 2012, pp. 8.

Chiu, et al.,"Improving the Kinect by Cross-Modal Stereo" In Proceedings of 22nd British Machine Vision Conference, Aug. 2011, pp. 10.

Baak, et al., "A Data-Driven Approach for Real-Time Full Body Pose Reconstruction from a Depth Camera" In IEEE International Conference on Computer Vision, 2011, Nov. 13, 2011, pp. 8.

Knoop, et al., "Sensor Fusion for 3D Human Body Tracking with an Articulated 3D Body Model", In Proceedings of the IEEE International Conference on Robotics and Automation, May 19, 2006, pp. 6.

Tykkala, et al., "Direct Iterative Closest Point for Real-Time Visual Odometry", In Proceedings of the IEEE International Conference on Computer Vision Workshops, Nov. 13, 2011, pp. 7.

Fitzgibbon, Andrew W., "Robust Registration of 2D and 3D Point Sets", In Proceedings of Image and Vision Computing, 2003, Dec. 1, 2003, pp. 10.

Besl, P., and McKay, N. 1992. A method for registration of 3D shapes. 239-256.

Blais, G., and Levine, M. D. 1995. Registering multiview range data to create 3D computer objects. IEEE Transactions on Pattern Analysis and Machine Intelligence (PAMI) 17, 8, 820-824.

Campbell, N. D. F., Vogiatzis, G., Hernandez, C., and Cipolla, R. 2010. Automatic 3D object segmentation in multiple views using volumetric graph-cuts. Image and Vision Computing (IVC), 14-25.

Chen, Y., and Medioni, G. 1992. Object modeling by registration of multiple range images. Image and Vision Computing (IVC) 10, 3, 145-155.

Cohen, J. M., Tariq, S., and Green, S. 2010. Interactive fluid-particle simulation using translating Eulerian grids. In Proceedings of the SIGGRAPH symposium on Interactive 3D Graphics and Games.

Curless, B., and Levoy, M. 1996. A volumetric method for building complex models from range images. In ACM Transactions on Graphics (SIGGRAPH).

Davison, A. J., and Murray, D. W. 1998. Mobile robot localisation using active vision. In Proceedings of the European Conference on Computer Vision (ECCV).

Elfes, A. and Matthies, L. 1987. Sensor integration for robot navigation: combining sonar and range data in a grid-based representation. In Proceedings of the IEEE Conference on Decision and Control.

Frahm, J.-M., Georgel, P. F., Gallup, D., Johnson, T., Raguram, R., Wu, C., Jen, Y.-H., Dunn, E., Clipp, B., and Lazebnik, S. 2010. Building Rome on a cloudless day. In Proceedings of the European Conference on Computer Vision (ECCV).

Furukawa, Y., Curless, B., Seitz, S. M., and Szeliski, R. 2010. Towards internet-scale multi-view stereo. In Proceedings of the IEEE Conference on Computer Vision and Pattern Recognition (CVPR).

Goesele, M., Curless, B., and Seitz, S. M. 2006. Multiview stereo revisited. In Proceedings of the IEEE Conference on Computer Vision and Pattern Recognition (CVPR).

Grand, S. L. 2007. Broad-phase collision detection with CUDA. In GPU Gems 3, Addison-Wesley Professional.

Hadwiger, M., Ljung, P., Salama, C. R., and Ropinski, T. 2008. Advanced illumination techniques for GPU volume raycasting. In ACM SIGGRAPH Asia Courses. (2 Documents).

Klein, G., and Murray, D. W. 2007. Parallel tracking and mapping for small AR workspaces. In Proceedings of the International Symposium on Mixed and Augmented Reality (ISMAR).

Levoy, M., Pulli, K., Curless, B., Rusinkiewicz, S., Koller, D., Pereira, L., Ginzton, M., Anderson, S. E., Davis, J., Ginsberg, J., Shade, J., and Fulk, D. 2000. The digital Michelangelo Project: 3D scanning of large statues. In ACM Transactions on Graphics (SIGGRAPH).

Lorensen, W. E., and Cline, H. E. 1987. Marching cubes: A high resolution 3D surface construction algorithm. In ACM Transactions on Graphics (SIGGRAPH).

Newcombe, R. A., and Davison, A. J. 2010. Live dense re-construction with a single moving camera. In Proceedings of the IEEE Conference on Computer Vision and Pattern Recognition (CVPR).

Nguyen, H. 2007. Gpu Gems 3. Addison-Wesley Professional. Can be found at the following link: http://http.developer.nvidia.com/GPUGems3/gpugems3_pref01.html.

Osher, S., and Fedkiw, R. 2002. Level Set Methods and Dynamic Implicit Surfaces. Springer. Book.

Parker, S., Shirley, P., Livnat, Y., Hansen, C., and Sloan, P. 1998. Interactive ray tracing for isosurface rendering. In Proceedings of Visualization.

Pollefeys, M., Nist 'E R, D., Frahm, J. M., Akbarzadeh, A., Mordohai, P., Clipp, B., Engels, C., Gallup, D., Kim, S. J., Merrell, P., Salmi, C., Sinha, S., Talton, B., Wang, L., Yang, Q., Stew'E Nius, H., Yang, R., Welch, G., and Towles, H. 2008. Detailed real-time urban 3D reconstruction from video. International Journal of Computer Vision (IJCV) 78, 2-3, 143-167.

Purcell, T. J., Buck, I., Mark, W. R., and Hanrahan, P. 2005. Ray tracing on programmable graphics hardware. In ACM SIGGRAPH Courses.

Rusinkiewicz, S., Hall-Holt, O., and Levoy, M. 2002. Real-time 3D model acquisition. In ACM Transactions on Graphics (SIGGRAPH).

Seitz, S. M., Curless, B., Diebel, J., Scharstein, D., and Szeliski, R. 2006. A comparison and evaluation of multiview stereo reconstruction algorithms. In Proceedings of the IEEE Conference on Computer Vision and Pattern Recognition (CVPR).

Stuehmer, J., Gumhold, S., and Cremers, D. 2010. Real-time dense geometry from a handheld camera. In Proceedings of the DAGM Symposium on Pattern Recognition.

Thrun, S., Burgard, W., and Fox, D. 2005. Probabilistic Robotics. Cambridge: MIT Press.

Vogiatzis, G., Torr, P. H. S., Seitz, S. M., and Cipolla, R. 2008. Reconstructing relief surfaces. Image and Vision Computing (IVC) 26, 3, 397-404.

Wurm, K. M., Hornung, A., Bennewitz, M., Stachniss, C., and Burgard, W. 2010. OctoMap: A probabilistic, flexible, and compact 3D map representation for robotic systems. In Proceedings of the ICRA 2010 Workshop on Best Practice in 3D Perception and Modeling for Mobile Manipulation.

Zach, C., Pock, T., and Bischof, H. 2007. A globally optimal algorithm for robust TV-L1 range image integration. In Proceedings of the International Conference on Computer Vision (ICCV).

Zhou, K., Gong, M., Huang, X, and Guo, B. 2011. Data-parallel octrees for surface reconstruction. IEEE Transactions on Visualization and Computer Graphics 17.

Stein, F., and Medioni, G. 1992. Structural Indexing: Efficient 3-D Object Recognition. IEEE Transactions on Pattern Analysis and Machine Intelligence, vol. 14, No. 2, Feb. 1992.

Blog: Matt Cutts: Gadgets, Google, and SEO Apr. 9, 2010.

Channel Access Method—at the following link: http://en.wikipedia.org/wiki/Multiple_access_protocol#Circuit_mode_and_channelization_methods. Oct. 26, 2011.

Rusinkiewicz, S., and Levoy, M. Stanford University. Efficient Variants of the ICP Algorithm—at the following link: http://www.cs.princeton.edu/~smr/papers/fasticp/fasticp_paper.pdf 2001.

RGB-D Mapping: Using Depth Cameras for Dense 3D Modeling of Indoor Environments—at the following link: http://ils.intel-research.net/publications/17; 2010.

RSS Advanced Reasoning with Depth Cameras 2010 Workshop Papers: "RGB-D Mapping: Using Depth Cameras for Dense 3D Modeling of Indoor Environments"—at the following link: http://ils.intel-research.net/publications/45.

Sparse Distance Learning for Object Recognition Combining RGB and Depth Information—at the following link: http://ils.intel-research.net/publications/47, 2011.

(56) References Cited

OTHER PUBLICATIONS

ICRA 2010 Workshop paper: "Manipulator and Object Tracking for in Hand Model Acquisition"—at the following link: http://ils.intel-research.net/publications/14.

Harada, T. 2007. Real-time rigid body simulation on gpus. In GPU Gems 3, Addison-Wesley Professional.

Henry, P., Krainin, M., Herbst, E., Ren, X., and Fox, D. 2010. RGB-D mapping: Using depth cameras for dense 3D modeling of indoor environments. In Proceedings of the International Symposium on Experimental Robotics (ISER).

"International Search Report & Written Opinion for PCT Patent Application No. PCT/US2013/077736", Mailed Date: Mar. 27, 2014, Filed Date: Dec. 26, 2013, 15 Pages.

Higo, et al. "A Hand-held Photometric Stereo Camera for 3-D Modeling", In International Conference on Computer Vision, Sep. 29, 2009, pp. 1234-1241.

Anderson, et al., "Augmenting Depth Camera Output Using Photometric Stereo", In Conference on Machine Vision Applications, Jun. 13, 2011, pp. 369-372.

"International Search Report & Written Opinion for PCT Patent Application No. PCT/US2014/016749", Mailed Date: May 12, 2014, Filed Date: Feb. 18, 2014, 8 Pages.

Daniel, et al. "Pose Tracking from Natural Features on Mobile Phones", In IEEE/ACM International Symposium on Mixed and Augmented Reality, Sep. 15, 2008, pp. 125-134.

Breiman, Leo, "Random Forests", In Machine Learning, vol. 45, Issue 1, Oct. 2001, pp. 5-32.

Veas, et al., "Creating Meaningful Environment Models for Augmented Reality", In IEEE Virtual Reality Conference, Mar. 8, 2008, pp. 295-296.

"International Search Report & Written Opinion for PCT Patent Application No. PCT/US2014/012226", Mailed Date: May 12, 2014, Filed Date: Jan. 21, 2014, 8 Pages.

"Second Written Opinion Issued in PCT Application No. PCT/US2014/012226", Mailed Date: Apr. 7, 2015, 5 Pages.

"International Preliminary Report on Patentability Issued in PCT Application No. PCT/US2014/012226", Mailed Date: Jul. 9, 2015, 6 Pages.

\* cited by examiner

CAMERA POSE ESTIMATION FOR 3D RECONSTRUCTION

BACKGROUND

For many applications it is valuable to be able to track orientation and position of a camera as it moves in an environment. Orientation and position of a camera is known as camera pose. For example, in robotics, vehicle navigation, computer game applications, medical applications and other problem domains. Previous approaches have involved using color images captured by moving cameras, identifying features in those images such as lines and edges and tracking that information in a sequence of color images captured by the camera to try and estimate relative camera position. Existing approaches are limited in accuracy, robustness and speed. However, for many applications, accurate camera tracking is required in real-time, for example, in order that a robot may successfully move about in its environment.

The embodiments described below are not limited to implementations which solve any or all of the disadvantages of known camera pose estimation processes.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Camera pose estimation for 3D reconstruction is described, for example, to enable position and orientation of a depth camera moving in an environment to be tracked for robotics, gaming and other applications. In various embodiments, depth observations from the mobile depth camera are aligned with surfaces of a 3D model of the environment in order to find an updated position and orientation of the mobile depth camera which facilitates the alignment. For example, the mobile depth camera is moved through the environment in order to build a 3D reconstruction of surfaces in the environment which may be stored as the 3D model. In examples, an initial estimate of the pose of the mobile depth camera is obtained and then updated by using a parallelized optimization process in real time.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a real-time camera pose estimation system (also referred to as a camera tracking system) using depth images obtained from a mobile depth camera which emits and captures infra-red light, the system described is provided as an example and not a limitation. As those skilled in the art will appreciate, the present examples are suitable for application in a variety of different types of real-time camera tracking systems including but not limited to those using depth information obtained from stereo cameras and those using depth information obtained by emitting and capturing other types of electromagnetic radiation.

The term "image element" is used in this document to refer to a pixel, group of pixels, voxel, group of voxels, or other higher level component of an image.

The term "dense 3D model" is used in this document to refer to a representation of a three dimensional scene comprising objects and surfaces where that representation comprises detail about image elements of that scene. In contrast non-dense 3D models may comprise polygon-based or point-based representations of objects. In an example, all or many points from an incoming depth map may be used to describe surfaces (using a signed distance function isosurface representation in some examples) in the environment and this description forms a dense 3D model. A sparse model would only take a subset of the points to speed up calculations and reduce memory footprint.

Figure 1:
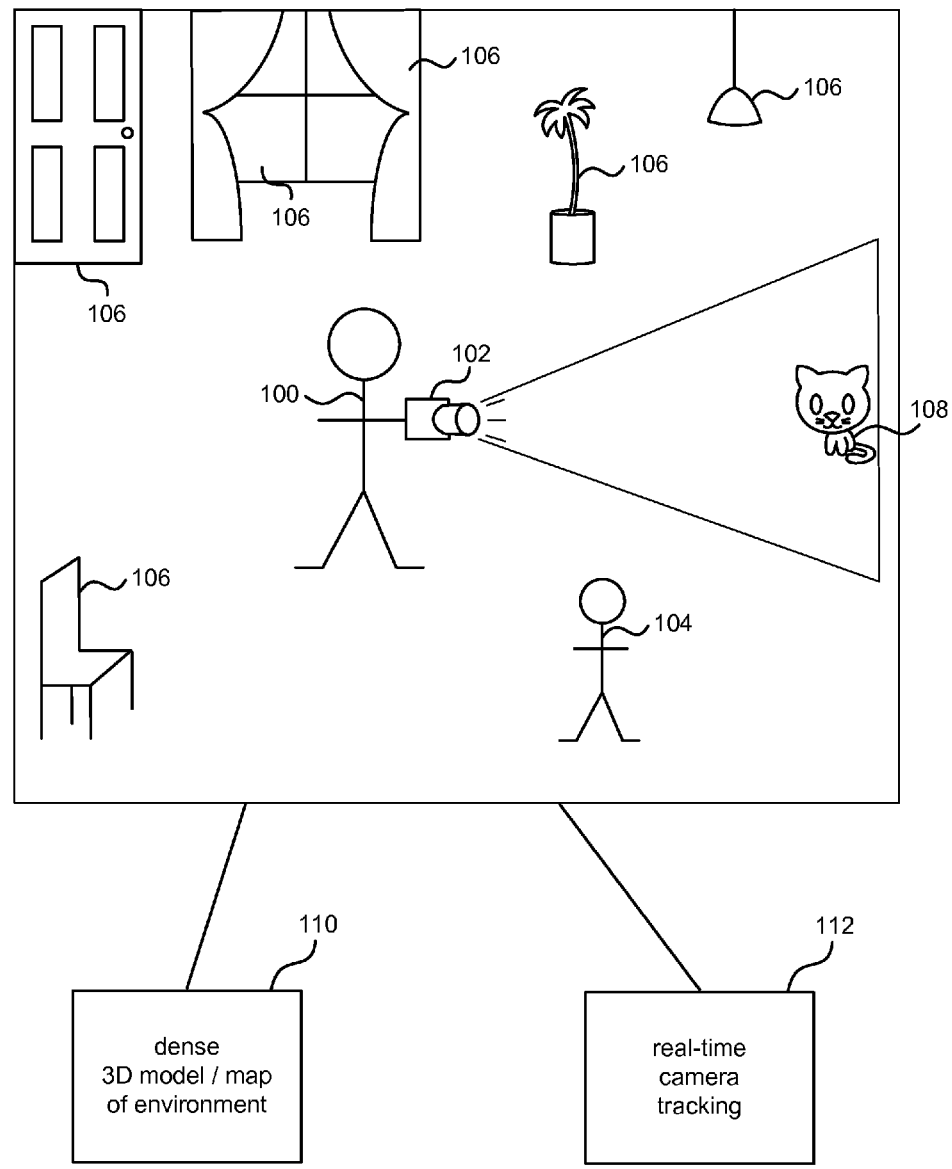
FIG. 1 is a schematic diagram of a person in a room holding a mobile depth camera which may be used for real-time camera tracking and optionally also to produce a dense 3D model or map of the room.

FIG. 1 is a schematic diagram of a person 100 standing in a room and holding a mobile depth camera 102 which in this example also incorporates a projector which is projecting the image of a cat 108 into the room. The room contains various objects 106 such as a chair, door, window, plant, light and another person 104. Many of the objects 106 are static although some of the objects such as person 104 may move. As the person moves around the room the mobile depth camera captures images which are used by a real-time camera tracking system 112 to monitor the location and orientation of the camera in the room. The real-time camera tracking system 112 may be integral with the mobile depth camera 102 or may be at another location provided that it is able to receive communication from the mobile depth camera 102, either directly or indirectly. For example, the real-time camera tracking system 112 may be provided at a personal computer, dedicated computer game apparatus, or other computing device in the room and in wireless communication with the mobile depth camera 102. In other examples the real-time camera tracking system 112 may be elsewhere in the building or at another remote location in communication with the mobile depth camera 102 using a communications network of any suitable type. The mobile depth camera 102 is also in communication with a dense 3D model 110 of the environment (which in this case is a 3D model of the room) or another type of map of the environment. For example, images captured by the mobile depth camera 102 are used to form and build up the dense 3D model of the environment as the person moves about the room. The real-time camera tracking system 112 may track the position of the camera in relation to the 3D model 110 or map of the environment. The outputs of the real-time camera tracking system 112 and dense 3D model 110 or map may be used by a game system or other application although that is not essential. For example, a projector at the mobile depth camera 102 may be arranged to project images depending on the output of the real-time camera tracking system 112 and 3D model 110.

Figure 2:
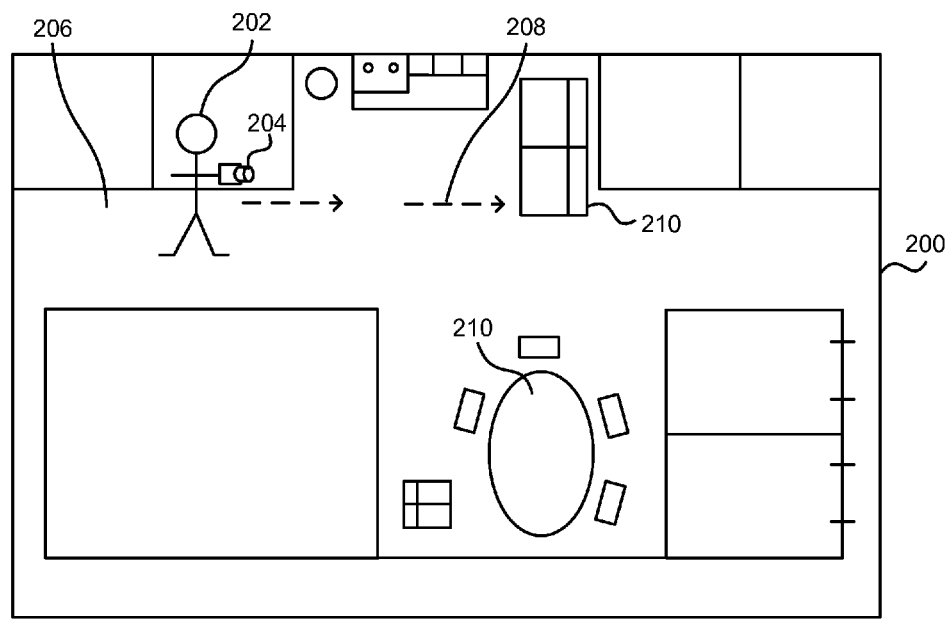
FIG. 2 is a plan view of a floor of a building which is being explored by a person holding a mobile depth camera.

FIG. 2 is a plan view of a floor 200 of a building. A person 202 holding a mobile depth camera 204 is moving around the floor as indicated by dotted arrows 208. The person walks along a corridor 206 past rooms and furniture 210. The real-time camera tracking system 112 is able to track the position of the mobile depth camera 204 as it moves and a 3D model or map of the floor is formed. It is not essential for a person 202 to carry the mobile depth camera 204. In other examples the mobile depth camera 204 is mounted on a robot or vehicle. This also applies to the example of FIG. 1.

Figure 3:
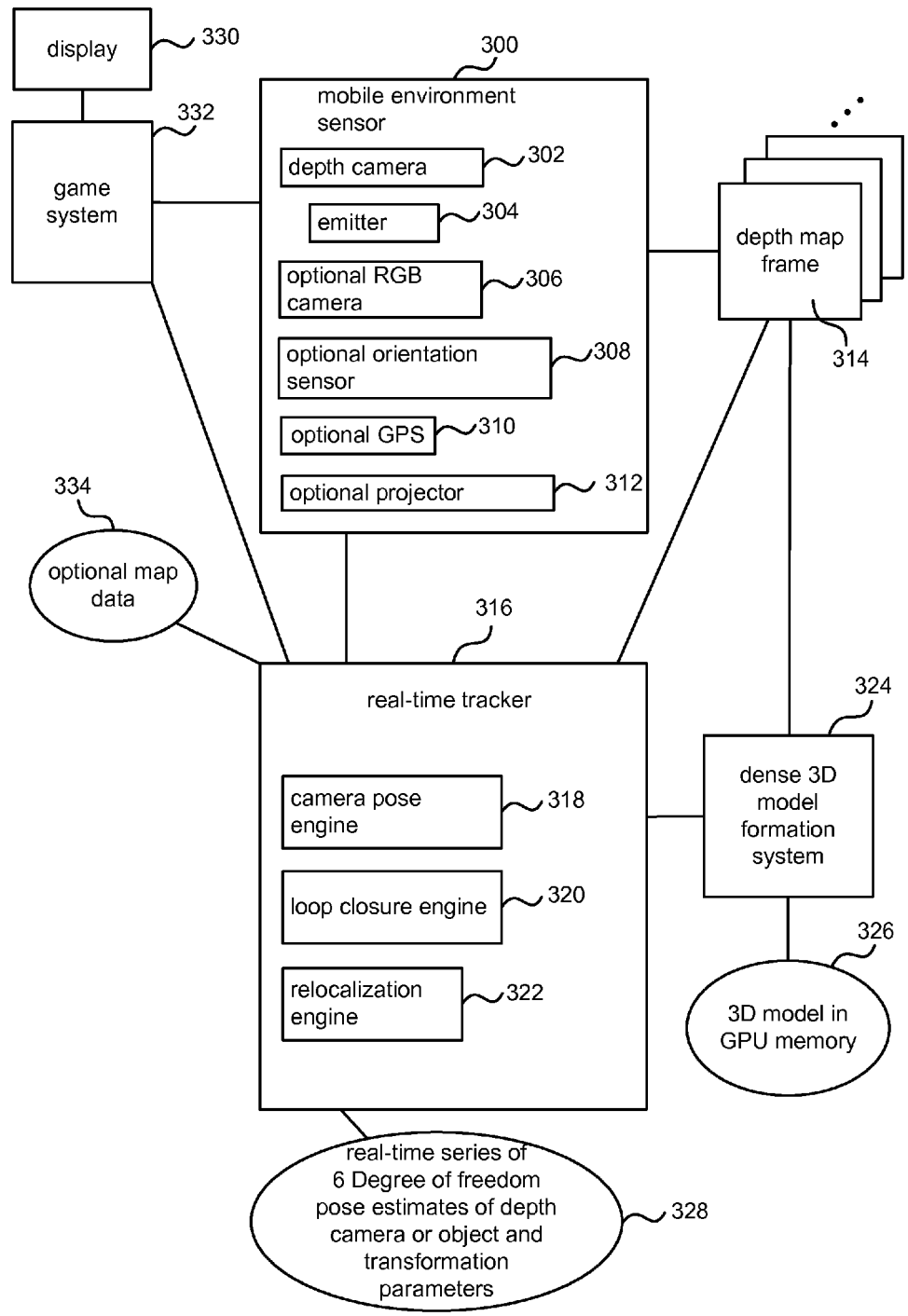
FIG. 3 is a schematic diagram of a mobile depth camera connected to a real-time camera tracking system, a dense 3D model formation system and a game system.

FIG. 3 is a schematic diagram of a mobile environment sensor 300 for use with a real-time camera tracker 316, dense model formation system 324 and optionally a game system 332. The mobile environment sensor 300 comprises a depth camera 302 which is arranged to capture sequences of depth images of a scene. Each depth image or depth map frame 314 comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In some cases the depth value may be a disparity value such as in situations where stereo depth information is available. In each captured depth image there may be around 300,000 or more image elements each having a depth value. The frame rate is high enough to enable the depth images to be used for working robotics, computer game or other applications. For example, at least 20 frames per second.

The depth information may be obtained using any suitable technique including but not limited to, time of flight, structured light, stereo images. In some examples the depth camera is able to organize the depth information into Z layers that are perpendicular to a Z axis extending along a line of sight of the depth camera.

The mobile environment sensor 300 may also comprise an emitter 304 arranged to illuminate the scene in such a manner that depth information may be ascertained by the depth camera 302. For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment sensor 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment sensor 300 to a location on the objects by analyzing the intensity of the reflected beam of light over time via various techniques including, for example, shuttered light pulse imaging.

In another example, the mobile environment sensor 300 can use structured light to capture depth information. In such a technique patterned light (e.g. light displayed as a known pattern such as a grid or stripe pattern) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene. In some cases, the mobile environment sensor 300 emits a spatially varying and/or time varying pattern of electromagnetic radiation and that pattern is calibrated so that when an image is received by the depth camera 302 it is able to perform pattern matching against a database of patterns and thus calculate depth information. This can be thought of as a 3D pattern of dots being projected into the environment, and wherever there is a surface that pattern is reflected so the depth camera 302 can detect it and calculate the distance of that surface from the depth camera 302.

In another example, the depth camera 302 comprises a pair of stereo camera such that visual stereo data is obtained and resolved to generate relative depth information. In this case the emitter 304 may be used to illuminate the scene or may be omitted.

In some examples, in addition to the depth camera 302, the mobile environment sensor 300 comprises a color video camera referred to as an RGB camera 306. The RGB camera 306 is arranged to capture sequences of images of the scene at visible light frequencies.

The mobile environment sensor 300 may comprise an orientation sensor 308 such as an inertial measurement unit (IMU), accelerometer, gyroscope, compass or other orientation sensor 308. However, it is not essential to use an orientation sensor. The mobile environment sensor 300 may comprise a location tracking device such as a GPS 310 although this is not essential.

The mobile environment sensor may comprise a projector 312 as mentioned above with reference to FIG. 1 although this is not essential.

The mobile environment sensor also comprises one or more processors, a memory and a communications infrastructure as described in more detail below.

The mobile environment sensor may be provided in a housing which is shaped and sized to be hand held by a user or worn by a user. In other examples the mobile environment sensor is sized and shaped to be incorporated or mounted on a vehicle, toy or other movable apparatus.

The mobile environment sensor 300 is connected to a real-time tracker 316. This connection may be a physical wired connection or may use wireless communications. In some examples the mobile environment sensor 300 is connected indirectly to the real-time tracker over one or more communications networks such as the internet.

The real-time tracker 316 is computer implemented using a general purpose microprocessor controlling one or more graphics processing units (GPUs). It comprises a camera pose engine 318 and optionally a loop closure engine 320 and a relocalization engine 322. The real-time tracker 316 takes depth map frames 314 from the depth camera 302, and optionally also input from the mobile environment sensor 300, optional map data 334 and optional data from a game system 332. The real-time tracker operates to compute the camera pose from the 3D model 326 and the depth map frame 314 sequence in order to produce a real-time series 328 of six degree of freedom pose estimates of the depth camera 302. It may also produce transformation parameters (also referred to as registration parameters) for transforms between pairs of depth map frames. In some examples the real-time tracker operates on pairs of depth map frames 314 from the depth camera in order to produce an initial estimate of camera pose. In various examples, the real-time tracker 316 takes a single depth map frame 314 and aligns that with a dense 3D model 326 of the scene. In some examples the real-time tracker uses color video input from the RGB camera 306 in order to produce an initial estimate of camera pose.

For example, in some embodiments the real-time tracker 316 provides output to a dense 3D model formation system 324 which uses that information together with the depth map frames 314 to form and store a dense 3D model of the scene or environment in which the mobile environment sensor 300 is moving. For example, in the case of FIG. 1 the 3D model would be a 3D model of the surfaces and objects in the room. In the case of FIG. 2 the 3D model would be a 3D model of the floor of the building including the objects and surfaces on that floor of the building. The dense 3D model 326 may be stored in GPU memory or in other ways. For example, the dense 3D model may be stored as a linear array in slice-row-column order, optionally with some padding so that slices and rows align certain memory block sizes. For example, the model may be stored in GPU texture memory or it may be stored as a linear array of memory locations used to represent a 3D volume. This may be achieved by mapping each voxel (or other 3D image element such as a group of voxels) to a memory array index using a linear pitched memory which provides fast, parallel access to the data stored on the parallel computing unit memory. Each voxel may store a numerical value which may be zero at a surface represented by the model, positive outside objects represented by the model and negative inside objects represented by the model, where the magnitude of the numerical value is related to distance from the closest surface represented by the model.

The mobile environment sensor 300 may be used in conjunction with a game system 332 which is connected to a display 330. For example, the game may be a golf game, boxing game, motor car racing game or other type of computer game. Data from the game system 332 such as the game state or meta data about the game may be provided to the real-time tracker 316. Also, information from the real-time tracker may be used by the game system 332 to influence the course of a game. Information from the 3D model may also be used by the game system 332 to influence the course of a game.

Map data 334 is optionally available to the real-time tracker 316. For example, this may be an architect's drawing of the environment (e.g. room or floor of building), the location of landmarks known in the environment, a map of the environment available from another source.

The camera pose engine 318 of the real-time tracker is arranged to compute the camera pose by finding a camera pose which gives a good alignment of a depth map frame with the dense 3D model. It uses an iterative process which may be implemented using one or more graphics processing units, or using multiple CPU cores, in order that the camera pose engine operates in real-time. More detail about the camera pose engine is given below with reference to FIG. 4. In contrast, previous approaches have used iterative closest point (ICP) algorithms to track camera pose. By using a camera pose engine 318 which calculates a camera pose which gives a good alignment of a depth map frame with surfaces depicted in the 3D model of the camera's environment, a faster and more accurate camera tracking is achieved (with respect to previous ICP approaches). The camera pose engine 318 is also robust to sudden large movements as initial estimates of the camera pose may be computed, for example, as described with reference to FIG. 10 below.

The loop closure engine is arranged to detect when the mobile environment sensor has moved in a loop so that the scene depicted in the current depth frame is at least partially overlapping with that of a previous depth frame which is not the immediately preceding depth frame. For example, this may occur when a user walks around the whole floor of the building in FIG. 2 and reaches the starting point again. It may also occur when a user moves around a room behind some furniture and out again to the original start position, or close to that original start position.

The relocalization engine 322 is arranged to deal with the situation where the real-time tracker loses the current location of the mobile environment sensor 300 and relocalizes or finds the current location again.

The processing performed by the real-time tracker 316 and/or the dense 3D model formation system 324 can, in one example, be executed remotely from the location of the mobile environment sensor 300. For example, the mobile environment sensor 300 can be connected to (or comprise) a computing device having relatively low processing power, and which streams the depth images over a communications network to a server. The server has relatively high processing power, and performs the computationally complex tasks of the real-time tracker 316 and/or the dense 3D model formation system 324. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

In an example, input from an RGB camera at the mobile environment sensor may be used to complement information from the depth camera. This is useful in situations where depth does not provide adequate information for tracking, such as when a camera is moving in an environment with few depth features. If visual features are present in the environment these may be detected by the RGB camera and used to enable localization and mapping to be provided.

Figure 4:
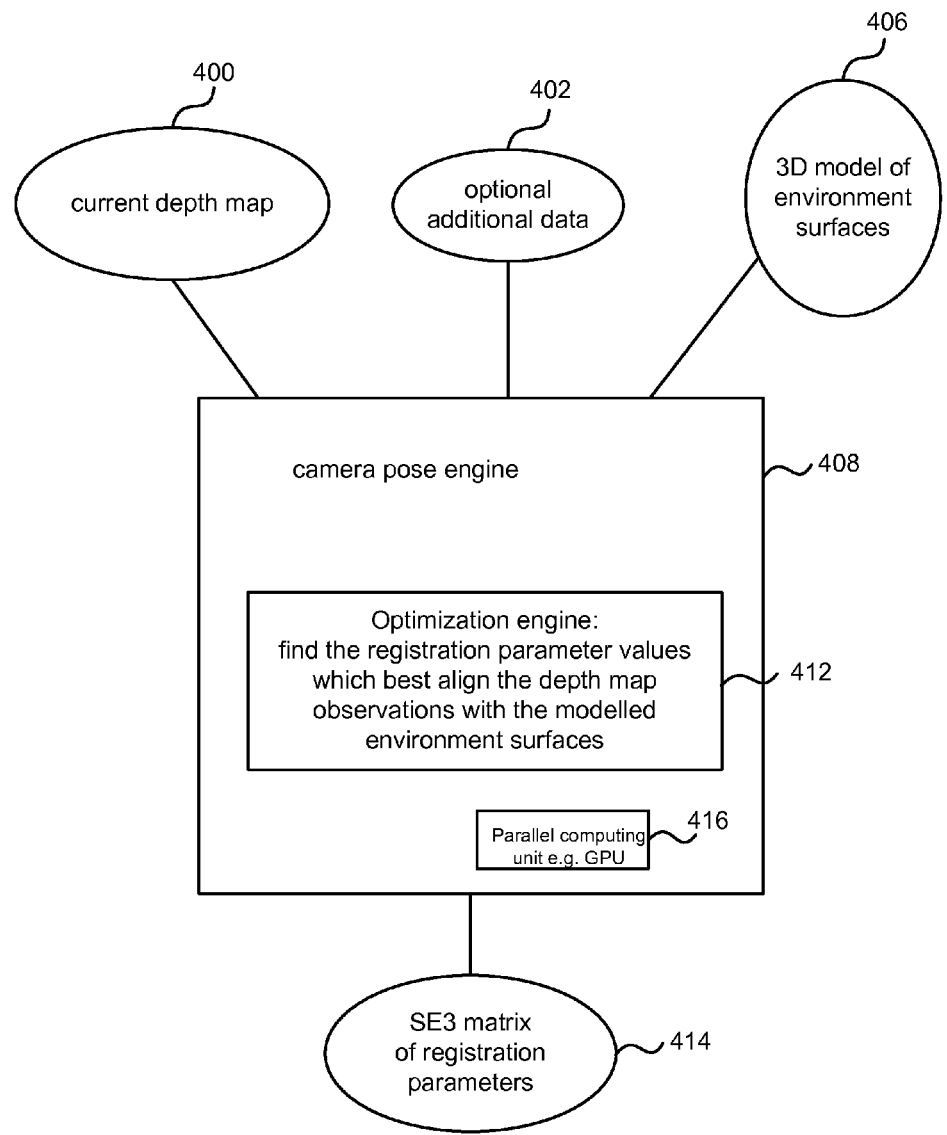
FIG. 4 is a schematic diagram of an example camera pose engine.

FIG. 4 is a schematic diagram of the camera pose engine 318 of FIG. 3 in more detail. The camera pose engine 408 is computer implemented at a computing device having one or more GPUs 416 or other parallel computing units and optionally also, texturing hardware. For example, the parallel computing units may be vector processors, single instruction multiple data (SIMD) architectures, graphics processing units or other parallel computing devices. It comprises optimization engine 412 for finding camera registration parameter values which align the depth map observations with the modeled environment surfaces. The camera pose engine receives the current depth map 400 from the depth camera. The camera pose engine has access to a dense 3D model of surfaces in the environment 406. For example, the 3D model comprises a 3D function which is a truncated signed distance function that is negative inside objects, positive outside objects and zero at surfaces. The model may be stored in system memory or GPU memory as described in more detail below. The camera pose engine may also receive optional additional data 402 such as color images, sensor data and other information which may be used to compute an initial estimate of camera pose registration parameters.

The output of the camera pose engine 408 is a set of registration parameters $\theta=(q,t)$ 414 of a transform from camera space to world space. In some examples these registration parameters are provided as a six degree of freedom (6DOF) pose estimate in the form of an $SE_3$ matrix describing the rotation and translation of the depth camera 302 relative to real-world coordinates. More formally, the $SE_3$ matrix which is a camera space to world space transformation matrix can be expressed as:

$$T(\theta) = \begin{pmatrix} R(q) & t \\ 0 & 1 \end{pmatrix}$$

The registration parameters may be a parameter vector $\theta=(q,t)$ where $q \in \mathbb{R}^4$ is a (normalized) quarternion representing a rotation, and $t \in \mathbb{R}^3$ represents a translation. $R(q)$ is a 3×3 rotation matrix defined as $$R(q) = \frac{1}{|q|^2} \begin{pmatrix} q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{pmatrix}$$

Coordinates in camera space (i.e. from the camera perspective) can be mapped to real-world coordinates by multiplying by the transformation matrix $T(\theta)$ given above.

The registration parameters $\theta=(q,t)$ may be provided in any suitable form, not necessarily as a vector. These registration parameters are used by the real time tracker 316 to produce the real-time series of 6 degree of freedom pose estimates of the depth camera.

The optimization engine 412 for finding the camera registration parameter values which align the depth map observations with the modeled environment surfaces may optimize an energy function. The energy function expresses an aim of finding a camera pose which aligns well the observed depth map points and the model surface (once those quantities have been mapped into a form that enables a direct comparison).

An example of a suitable energy function is:

$$E(\theta) = \tfrac{1}{2} \Sigma_{i=0}^{n-1} d(HVT(\theta)\acute{x}_i)^2$$

Which may be expressed in words as, an energy of a function of a camera pose registration parameter vector is equal to one half of the sum over image elements of the square of the truncated signed distance d given by the 3D model at the position of the current image element transformed by the current pose estimate. Matrix V transforms from world space to model space and matrix H is a formatting matrix.

The symbol $x_i$ denotes an observed surface point (from the depth map) for image element i. For example, let $x_i \in \mathbb{R}^3$ for i=0, ..., n−1 be the observed surface points in camera space obtained by back projecting the valid image elements of a depth map.

The symbol $\acute{x}_i$ denotes the promotion of a 3 element vector storing the observed surface point to a 4 element vector in order to facilitate calculation. More formally, let $\acute{x}$ denote the promotion of an inhomogeneous vector $x \in \mathbb{R}^3$ to a homogeneous vector $\in \mathbb{R}^4$ by appending a 1 to its elements, and let $H=[I_3|0]$ be the 3×4 matrix that strips the final row from its right-hand operand.

The symbol d represents a model distance value. For example, let $d: \mathbb{R}^3 \to [-1,1]$ be a truncated signed distance function evaluated at continuous valued positions by tri-linearly interpolating samples stored at voxel centres in the 3D model. Outside the discrete voxel grid d=1. The model of the surfaces in the environment is given by the level set $d(\bullet)=0$.

The matrix V may be a 4×4 affine matrix representing a similarity transformation from world space to model space (also referred to as volume space). Volume space may refer to the discrete coordinates of a voxel grid, which in turn determines the memory location of the voxel elements. For example, the factors affecting V may be: the dimensions of the discrete voxel grid, the length of each voxel, and the position of the world origin within the volume.

The optimization engine 412 may use any suitable optimization process such as a Gauss-Newton method, a gradient descent method, a limited memory Broyden-Fletcher-Goldfarb-Shanno (LBFGS) method and a Levenberg-Marquardt method.

Figure 5:
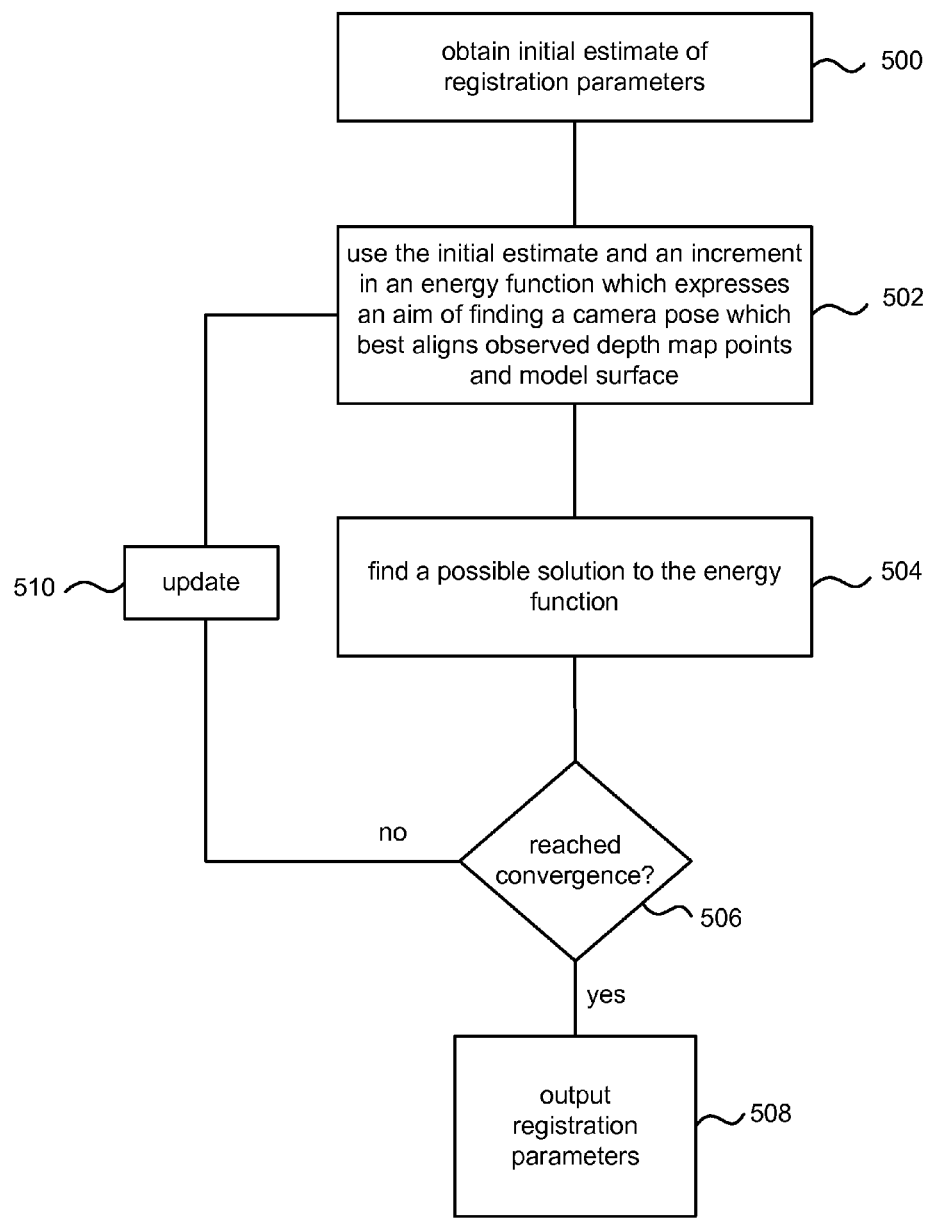
FIG. 5 is a flow diagram of a method at a camera pose engine

FIG. 5 is a flow diagram of an example iterative process at the optimization engine 412. An initial estimate of the registration parameters is obtained 500. These are the registration parameters of a transform for aligning the current and source frames. This initial estimate is formed in any suitable manner as described in more detail below with reference to FIG. 10.

An energy function is formed as described above with reference to FIG. 4 which expresses an aim of finding a camera pose which aligns well the observed depth map points and the model surface (once those quantities have been mapped into a form that enables a direct comparison). The initial estimate, the depth map data and the model data are used to compute the quantities of the energy function and find a possible solution 504 to an unknown increment to the initial estimate. A test is made to check 506 whether convergence has been reached. This check is a decision as to whether the iterative process is to continue or not. If the iterative process continues an update 510 is made to a parameter which controls the amount of change between iterations. For example, this parameter is increased to move away from local minima or decreased to speed convergence. The update 510 to the parameter is optional and may be omitted. If the iterative process ends the registration parameters are output 508. More detail about the check 506 is given below with reference to FIG. 9.

Figure 6:
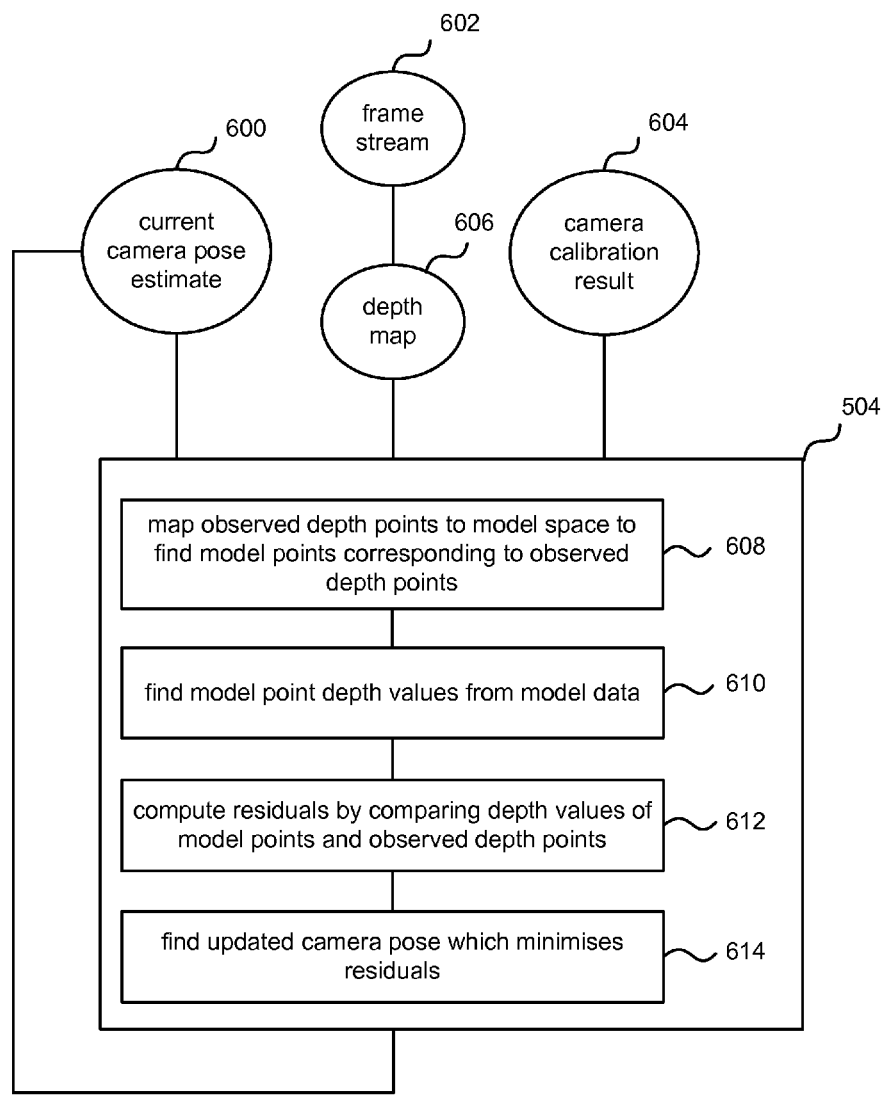
FIG. 6 is a flow diagram of part of the method of FIG. 5.

FIG. 6 is a flow diagram showing more detail of step 504 of FIG. 5 in which a possible solution to the energy function is found by the optimization engine. This process is repeated iteratively as indicated in FIG. 5 although the iteration is not indicated in FIG. 6.

The inputs to this process comprise the current camera pose estimate 600. For example, this is the estimate computed from the previous depth frame. When camera tracking is started, the current camera pose estimate may be an initial estimate obtained from a process as described below with reference to FIG. 10. Another input is the current depth map 606 from a frame stream 602 of depth maps captured by the camera. Another input is a camera calibration result 604 although this is optional.

Figure 7:
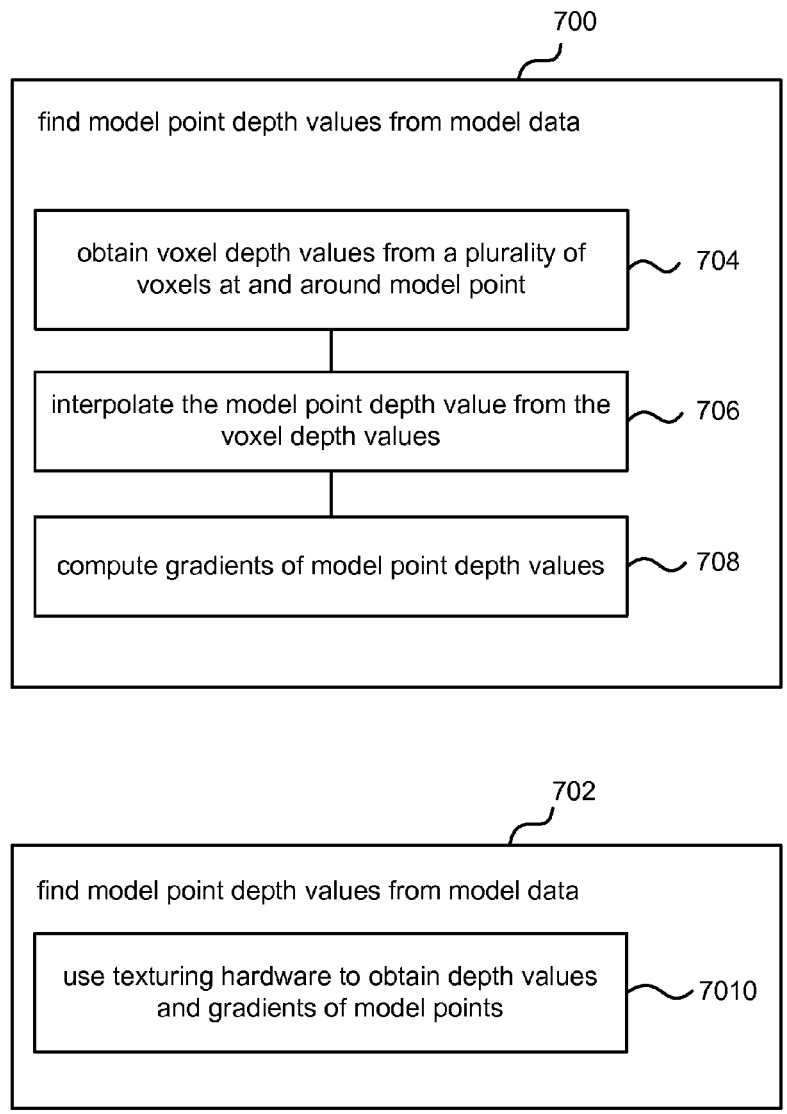
FIG. 7 shows methods which may be used as part of the method of FIG. 6.

The optimization engine maps 608 the observed depth points (from depth map 606) to model space to find model points corresponding to the observed depth points. Subsampling may be used whereby every nth depth point from the depth map is processed in order to reduce processing requirements. Distance values from the 3D surfaces 610 are computed from the model data. For example, this is achieved by using interpolation as described in more detail below with reference to FIG. 7.

Figure 8:
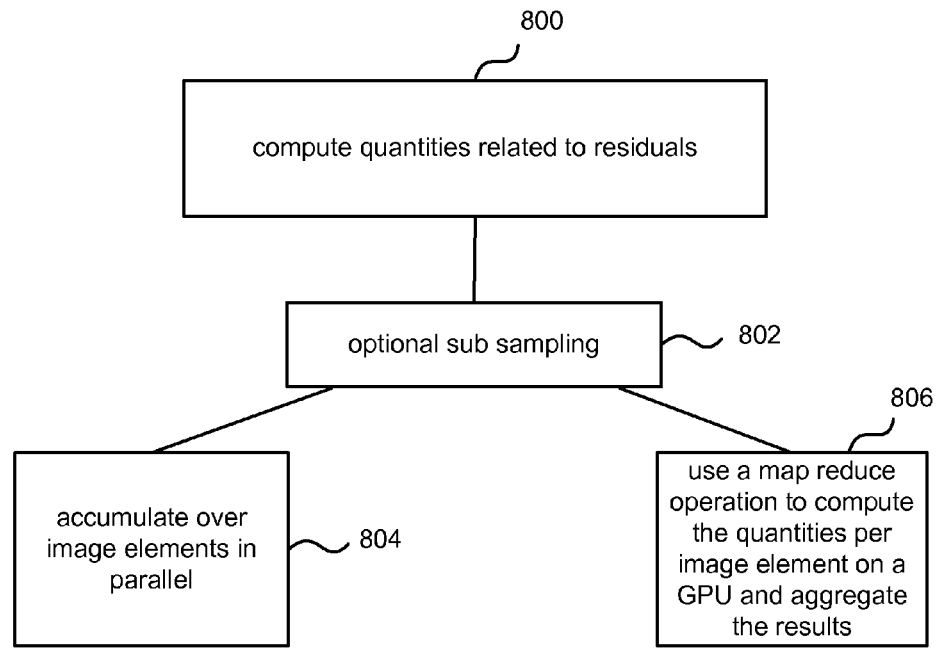
FIG. 8 is a flow diagram of methods of computing quantities related to residuals as part of the process of FIG. 6.

Residuals are computed 612 by comparing the distance values of the model and the observed depth points from the depth map. An updated camera pose is then computed 614 which minimizes the residuals. More detail about how quantities relating to the residuals may be calculated in real time is given below with reference to FIG. 8.

More detail about how model distance values 610 may be computed from the model data in real time is now given. In some examples, the optimization engine obtains 704 voxel distance values from a plurality of voxels of the 3D model at and around the model point. The model position is a point from the depth map which is converted to model space. Any suitable number of voxels at and around the model position may be selected. Each voxel stores a distance value which is a truncated signed distance as described above. An interpolation 706, such as a tri-linear interpolation is calculated using the distance values of the selected voxels to obtain a distance value for the model position. Gradients of the model position distance values may also be calculated 708 using the selected voxels for use in the optimization.

In some examples, the camera pose engine comprises texturing hardware which is specialist computer graphics hardware for computing textures of surfaces. The texturing hardware may be used to compute depth values and gradients of the model positions in real time. Texturing hardware may comprise two elements: texture memory and texture sampling. Texture memory is an area of memory on a GPU used for storing textures. For example, the volume array may be stored in GPU texture memory. A GPU may have specialized hardware to perform interpolation on texture memory very efficiently. For example, tri-linear interpolation may be performed.

As mentioned above, the optimization engine 412 may use any suitable optimization process such as a Gauss-Newton method, a gradient descent method, a limited memory Broyden-Fletcher-Goldfarb-Shanno (LBFGS) method and a Levenberg-Marquardt method. In an example, a Levenberg-Marquardt method is used which comprises computing for each iteration of the optimization process, a solution to the following equation:

$$(J^T J + \lambda I)\delta = -J^T r$$

Which may be expressed in words as, an unknown vector δ which increments an initial estimate of the camera pose registration parameters, times $J^T J$ (which is a square matrix given by the transpose of J multiplied on the right by J) plus a scalar times the identity matrix, is equal to the residuals times the negative of the transpose of J which is $J^T$ where J is the Jacobian of the residuals vector.

In this example, where a Levenberg-Marquardt method is used, a main computation for the optimization engine is to calculate the 7×7 (or other size) matrix $J^T J$ at each iteration and also the 7×1 (or other size) vector $J^T r$ at each iteration. These quantities 800 which are related to the residuals may be computed, in the case that a multi-core computer is used, by accumulating 804 over image elements in parallel. In this way real time computation may be achieved. An optional subsampling 802 is used to speed up processing by selecting every nth image element of the depth image to be processed. In the case that a GPU is present at the camera pose estimation engine, a map reduce operation 806 may be used to compute the quantities 800 which are related to the residuals on a per image element basis. The results of the map operation computed for each image element may be aggregated at the reduce stage to calculate the updated camera pose estimate.

Figure 9:
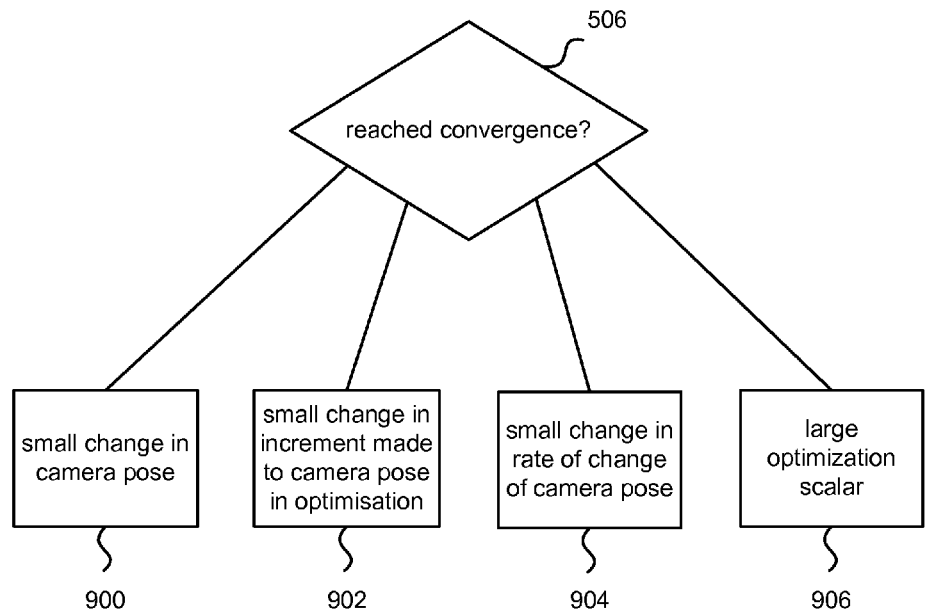
FIG. 9 is a schematic diagram illustrating ways of checking whether convergence is reached for use in the method of FIG. 5.

FIG. 9 gives more detail about how the decision check 506 on convergence may be made. For example the optimization engine may check the magnitude of the change in the camera pose at each iteration. If there is little or no change 900 then convergence is reached. In another example, the optimization engine may check the magnitude of the change in the increment to the camera pose at each iteration 902. If there is little or no change then convergence is reached. The optimization engine may check the rate of change of the calculated camera pose 904. If there is little or no change then convergence is reached. The optimization engine may check the size of the scalar quantity (updated at step 510 of FIG. 5 and referred to using symbol λ above) used to control the iteration. If this scalar is large then convergence may be reached. The optimization may use a combination of one or more of these or other criteria.

Figure 10:
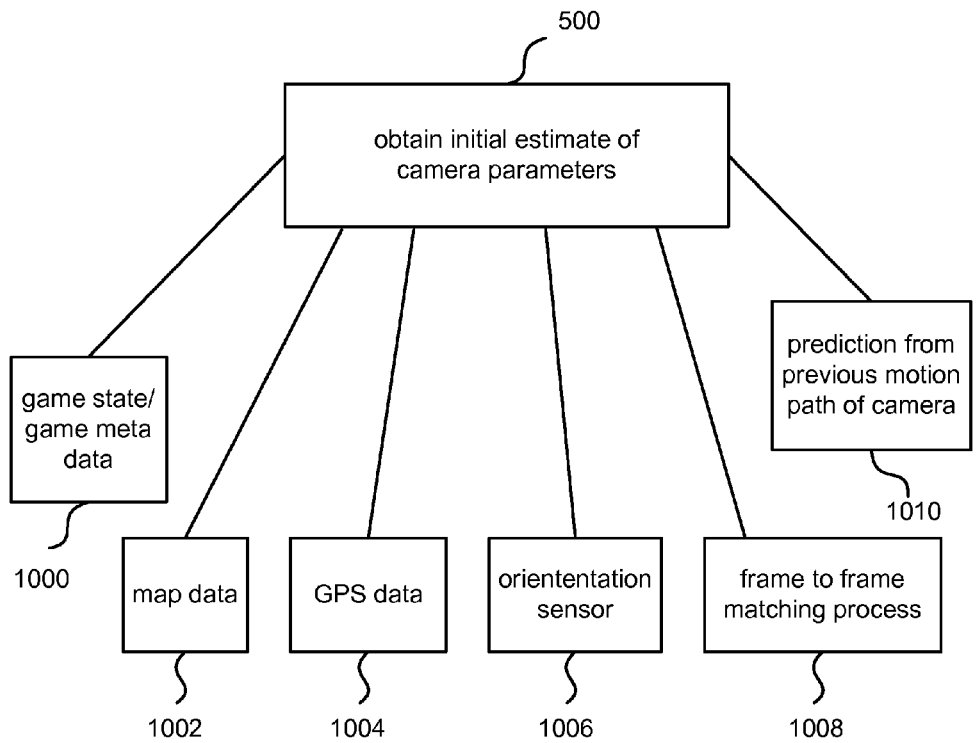
FIG. 10 is a schematic diagram illustrating ways of obtaining an initial estimate of camera pose registration parameters.

FIG. 10 gives more detail about how the initial estimate of the camera registration parameters 500 may be calculated. The initial estimate may be obtained from game state and or game meta data 1000 where this is available. The initial estimate may be obtained from map data 1002 where this is available as described above. The initial estimate may be obtained from GPS data 1004 where the real time camera tracking system comprises a GPS sensor and a user has given consent for GPS data to be used where appropriate. The initial estimate may be obtained from orientation sensor data 1006 where an orientation sensor is incorporated in the camera tracking system. The initial estimate may be predicted from a previous motion path of the camera 1010. For example, the camera may be assumed to have a constant velocity or a constant acceleration. The motion path of the camera from time 0 to time t−1 may be used to estimate where the camera will be at time t and thus obtain an estimate of the registration parameters.

In some examples the initial estimate is obtained from a frame to frame matching process 1008. In an example, the current and previous depth image frames are used in a frame to frame matching process. The current depth image frame is used to compute an image pyramid where an image pyramid comprises an image and a plurality of successively smaller versions of that image computed by successively downsampling or reducing the resolution. A corresponding image pyramid, having the same number of versions of the image at the same resolutions, is computed for the previous depth image frame.

Starting with the lowest resolution versions of the current and previous depth image frames, a frame to frame energy function is minimized to find a camera pose which best aligns the two frames. The camera pose is refined by repeating this process for successively higher resolution pairs of the previous and current depth image frames from the pyramids.

The frame to frame energy function expresses an energy which is related to the sum over image elements of the difference between depth values of surfaces depicted by corresponding image elements of the two frames. For example a frame to frame energy function which may be used is:

$$E_f(\theta)=\Sigma_i(e_2^T M(\theta)\acute{u}_i-z_1(\pi(M(\theta)\acute{u}_i)))^2$$

Which may be expressed in words as, an energy of a function of a camera pose registration parameter vector is equal to the sum over image elements i of the squares of the differences between, the depth component (obtained by applying a matrix transpose T with the unit vector $e_2$) of the 3D points in view space of the image elements of the previous frame, times a rigid transformation $M(\theta)$ from the view space of the previous frame to that of the current frame, and the 3D points in view space of the image element of the current frame, given a function $\pi(x)$ which represents the projection of a 3D viewspace coordinate x to a 2D image coordinate; where x is given by the corresponding depth value of the image element of the previous frame times the rigid transformation from the view space of the previous frame to that of the current frame.

The frame to frame energy function may be a nonlinear least squares problem as shown in the example above and may be optimized using Levenberg-Marquardt or any other suitable optimization process. The previous frame's pose may be used as an initial estimate of the camera pose registration parameter.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 11:
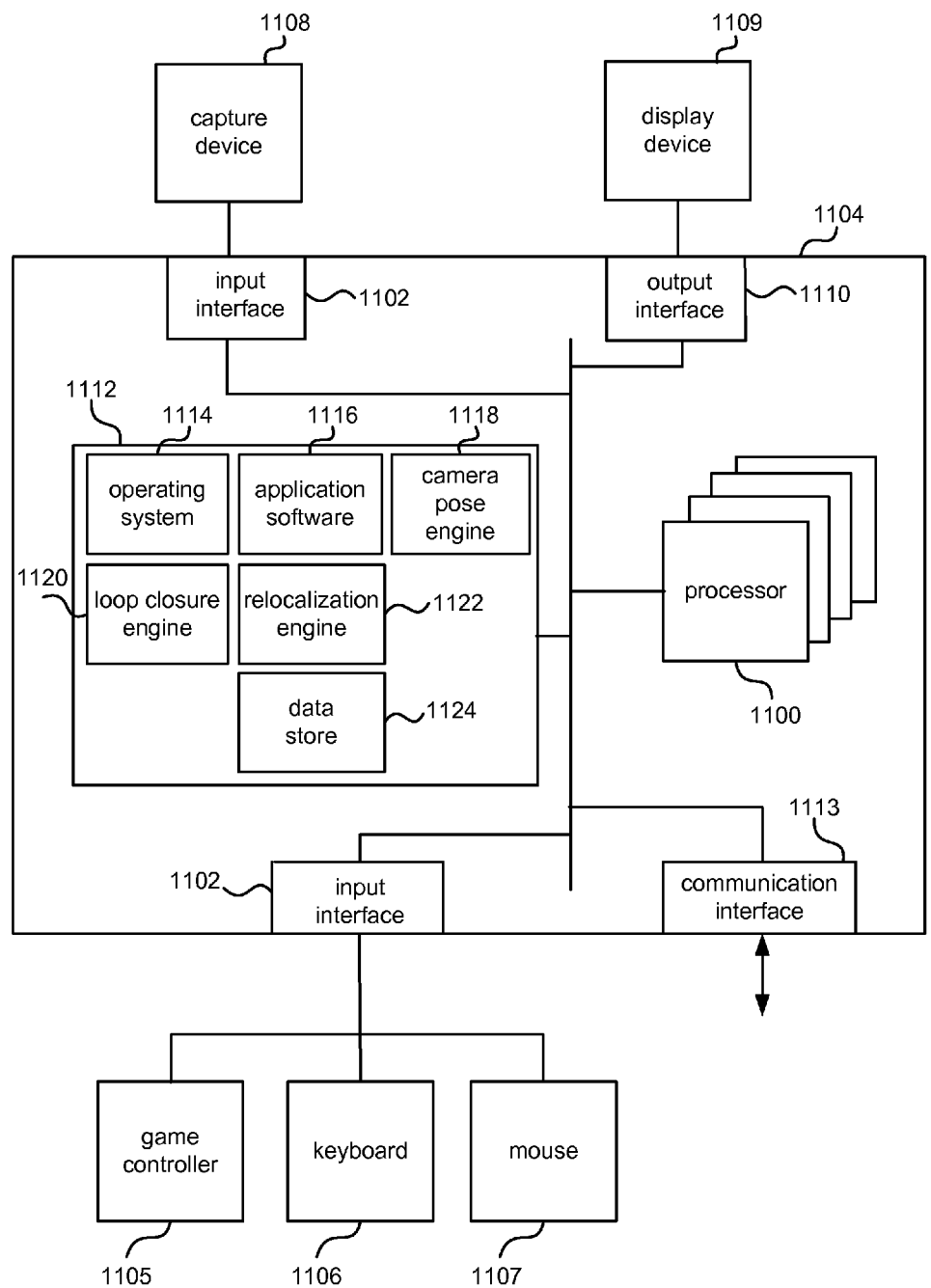
FIG. 11 illustrates an exemplary computing-based device in which embodiments of a real-time camera pose estimation system may be implemented.

FIG. 11 illustrates various components of an exemplary computing-based device 1104 which may be implemented as any form of a computing and/or electronic device, and in which embodiments of a real-time camera tracker may be implemented.

The computing-based device 1104 comprises one or more input interfaces 1102 arranged to receive and process input from one or more devices, such as user input devices (e.g. capture device 1108, a game controller 1105, a keyboard 1106, a mouse 1107). This user input may be used to control software applications or real-time camera tracking. For example, capture device 1108 may be a mobile depth camera arranged to capture depth maps of a scene. The computing-based device 1104 may be arranged to provide real-time tracking of that capture device 1108.

The computing-based device 1104 also comprises an output interface 1110 arranged to output display information to a display device 1109 which can be separate from or integral to the computing device 1104. The display information may provide a graphical user interface. In an example, the display device 1109 may also act as the user input device if it is a touch sensitive display device. The output interface 1110 may also output date to devices other than the display device, e.g. a locally connected printing device.

In some examples the user input devices 1005, 1007, 1008, 1009 may detect voice input, user gestures or other user actions and may provide a natural user interface (NUI). This user input may be used to control a game or other application. The output interface 1110 may also output data to devices other than the display device, e.g. a locally connected printing device.

The input interface 1102, output interface 1110, display device 1109 and optionally the user input devices 1105, 1107, 1108, 1109 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 1104. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1112) is shown within the computing-based device 1104 it will be appreciated that the storage may be distributed or located remotely and accessed via a network or other communication link (e.g. using communication interface 1113).

Computing-based device 1104 also comprises one or more processors 1100 which may be microprocessors, controllers or any other suitable type of processors for processing computing executable instructions to control the operation of the device in order to provide real-time camera tracking. In some examples, for example where a system on a chip architecture is used, the processors 1100 may include one or more fixed function blocks (also referred to as accelerators) which implement a part of the method of real-time camera tracking in hardware (rather than software or firmware).

Platform software comprising an operating system 1114 or any other suitable platform software may be provided at the computing-based device to enable application software 1116 to be executed on the device. Other software than may be executed on the computing device 1104 comprises: camera pose engine 1118, loop closure engine 1120, relocalization engine 1122. A data store 1124 is provided to store data such as previously received depth maps, registration parameters, user configurable parameters, other parameters, dense 3D models of scenes, game state information, game metadata, map data and other data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of real-time camera tracking comprising:
   receiving, at a processor, a sequence of depth map frames from a moving mobile depth camera each depth map frame comprising a depth value at each image element that depth value being related to a distance from the mobile depth camera to a surface in the environment captured by the mobile depth camera;
   accessing, by the processor, a 3D model of surfaces in the environment;
   tracking the position and orientation of the mobile depth camera by computing, at the processor, for each of a plurality of the depth map frames, an updated position and orientation of the mobile depth camera according to an alignment of the image elements of the depth map frame and a surface depicted in the 3D model of the environment, the alignment being based at least in part on at least one of:
   an energy of a function of a camera pose registration parameter vector being equal to one half of the sum over image elements of the square of a truncated signed distance given by the 3D model at the position of the current image element transformed by a current pose estimate; or
   an energy of a function of a camera pose registration parameter vector being equal to the sum over image elements of the squares of the differences between, a depth component of the 3D points in a view space of the image elements of a previous frame, times a rigid transformation from the view space of the previous frame to that of a current frame, and the 3D points in a view space of an image element of the current frame, given a function which represents the projection of a 3D view space coordinate to a 2D image coordinate, where the projection of the 3D view space coordinate is given by a corresponding depth value of the image element of the previous frame times the rigid transformation from the view space of the previous frame to that of the current frame.

2. A method as claimed in claim 1 comprising computing an initial estimate of the position and orientation of the mobile depth camera from two of the depth map frames by computing a camera pose which aligns the two frames.

3. A method as claimed in claim 1 wherein accessing the 3D model of surfaces comprises accessing a signed distance function representing the surfaces in the environment.

4. A method as claimed in claim 1 comprising mapping depth values of image elements from a depth map frame to model positions with respect to the 3D model.

5. A method as claimed in claim 4 comprising calculating depth values for the model positions from the 3D model.

6. A method as claimed in claim 5 comprising computing residuals by comparing the depth values of the model positions and the depth values of corresponding image elements from a depth map frame.

7. A method as claimed in claim 5 comprising interpolating the depth values of the model positions from a plurality of values obtained from the 3D model.

8. A method as claimed in claim 5 comprising using texturing hardware to compute the depth values of the model positions.

9. A method as claimed in claim 1 comprising computing the alignment of the image elements of the depth map frame and a surface depicted in the 3D model of the environment by using a parallel computing device to accumulate quantities related to the alignment over image elements in parallel.

10. A method as claimed in claim 1 comprising computing the alignment of the image elements of the depth map frame and a surface depicted in the 3D model of the environment by using a parallel processing unit to carry out a sum operation to compute quantities related to the alignment per image element.

11. A real-time camera tracker comprising:
a communications interface arranged to receive a sequence of depth map frames from a moving mobile depth camera each depth map frame comprising a depth value at each image element that depth value being related to a distance from the mobile depth camera to a surface in the environment captured by the mobile depth camera;
the communications interface being arranged to access a 3D model of surfaces in the environment;
a camera pose engine arranged to track the position and orientation of the mobile depth camera by computing, for each of a plurality of the depth map frames, an updated position and orientation of the mobile depth camera according to an alignment of the image elements of the depth map frame and a surface depicted in the 3D model of the environment, the alignment being based at least in part on at least one of:
an energy of a function comprising terms related at least to the square of a truncated signed distance, a transformation matrix, and a formatting matrix; or
an energy of a function comprising terms related at least to a depth component of the 3D points in a view space of the image elements of a previous frame, a rigid transformation from the view space of the previous frame to that of a current frame, and a projection of a 3D view space coordinate to a 2D image coordinate.

12. A real-time camera tracker as claimed in claim 11 the camera pose engine arranged to compute an initial estimate of the position and orientation of the mobile depth camera from two of the depth map frames by computing a camera pose which aligns the two frames.

13. A real-time camera tracker as claimed in claim 11 the communications interface being arranged to access the 3D model of surfaces by accessing a signed distance function representing the surfaces in the environment.

14. A real-time camera tracker as claimed in claim 11 the camera pose engine comprising a parallel computing device arranged to compute the alignment of the image elements of the depth map frame and a surface depicted in the 3D model of the environment by accumulating quantities related to the alignment over image elements in parallel.

15. A real-time camera tracker as claimed in claim 11 the camera pose engine comprising a graphics processing unit arranged to compute the alignment of the image elements of the depth map frame and a surface depicted in the 3D model of the environment by carrying out a map reduce operation to compute quantities related to the alignment per image element.

16. A real time camera tracker as claimed in claim 11 the camera pose engine being at least partially implemented using hardware logic selected from any one or more of: a field-programmable gate array, a program-specific integrated circuit, a program-specific standard product, a system-on-a-chip, a complex programmable logic device, a graphics processing unit (GPU), texturing hardware.

17. A game system comprising a real time camera tracker as claimed in claim 11, the game system being arranged to influence the course of a game in relation to location and orientation of one or more mobile depth cameras tracked by the real time camera tracker.

18. A computer storage media storing device-executable instructions that, when executed, cause a system to execute steps comprising:
receiving, at a processor, a sequence of depth map frames from a moving mobile depth camera each depth map frame comprising a depth value at each image element that depth value being related to a distance from the mobile depth camera to a surface in the environment captured by the mobile depth camera;
accessing, by the processor, a signed distance function representing surfaces in the environment; and
tracking the position and orientation of the mobile depth camera by computing, at the processor, for each of a plurality of the depth map frames, an updated position and orientation of the mobile depth camera on the basis of an alignment of the image elements of the depth map frame and at least part of the signed distance function, the alignment being based at least in part on at least one of:
an energy of a function comprising terms related at least to the square of a truncated signed distance, a transformation matrix, and a formatting matrix; or
an energy of a function comprising terms related at least to a depth component of the 3D points in a view space of the image elements of a previous frame, a rigid transformation from the view space of the previous frame to that of a current frame, and a projection of a 3D view space coordinate to a 2D image coordinate.

19. A computer storage media as claimed in claim 18 wherein the alignment of the image elements of the depth map frame and a surface depicted in the 3D model of the environment is computed by using a parallel computing device to accumulate quantities related to the alignment over image elements in parallel.

20. A computer storage media as claimed in claim 18 wherein the alignment of the image elements of the depth map frame and a surface depicted in the 3D model of the environment is computed by using a graphics processing unit (GPU) to carry out a map reduce operation to compute quantities related to the alignment per image element.

* * * * *